(No Model.) 2 Sheets—Sheet 1.
A. G. DEOBOLD.
GRAIN SCOURING AND CLEANING MACHINE.
No. 325,919. Patented Sept. 8, 1885.
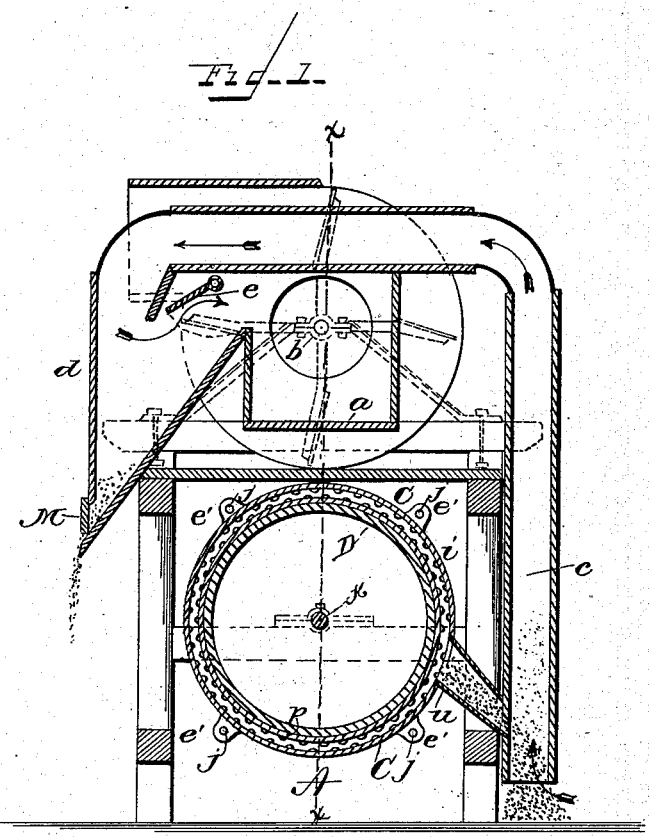
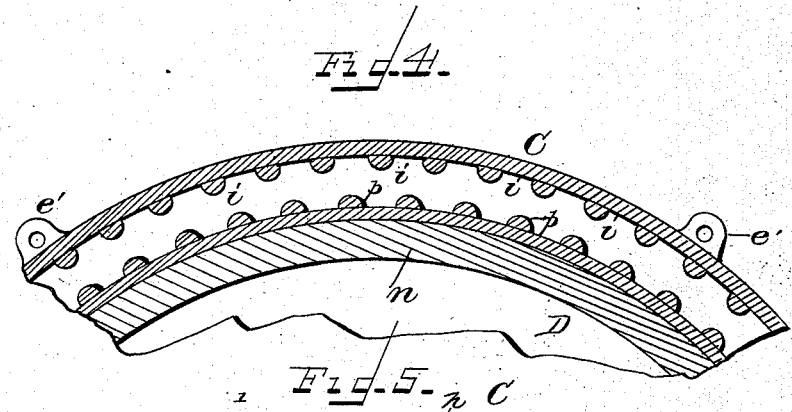
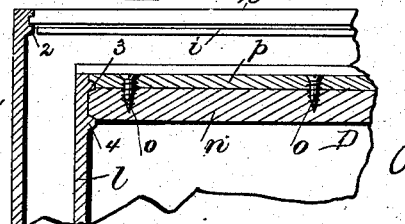
WITNESSES
F. L. Ourand
Frank A. Fouts
INVENTOR
Augustus G. Deobold
By Thomas Slade
Attorney (No Model.) 2 Sheets—Sheet 2.
A. G. DEOBOLD.
GRAIN SCOURING AND CLEANING MACHINE.
No. 325,919. Patented Sept. 8, 1885.
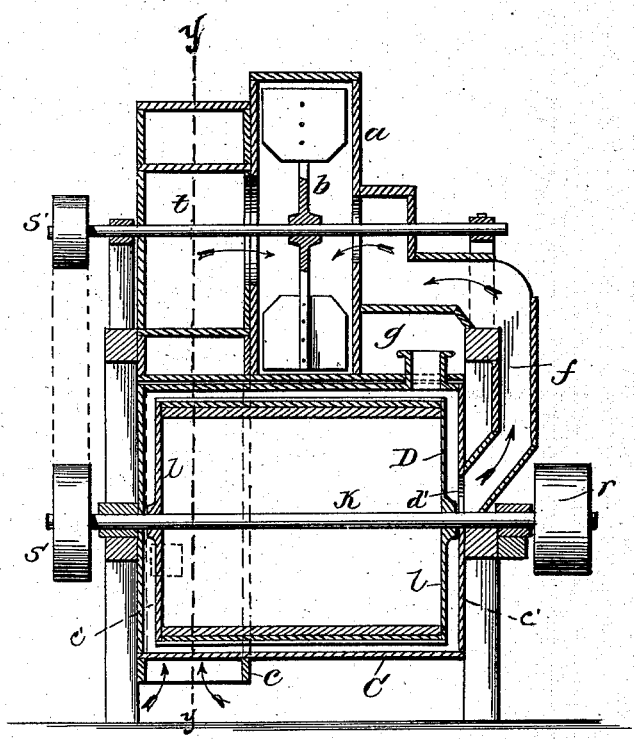
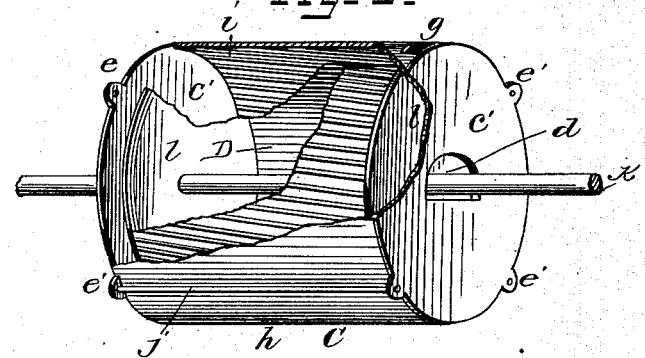
WITNESSES
J. L. Ourand
Frank A. Fouts
INVENTOR
Augustus G. Deobold
By Thomas Slade
Attorney

UNITED STATES PATENT OFFICE.

AUGUSTUS G. DEOBOLD, OF BLOOMINGTON, ILLINOIS.

GRAIN SCOURING AND CLEANING MACHINE.

SPECIFICATION forming part of Letters Patent No. 325,919, dated September 8, 1885.

Application filed April 8, 1885. (No model.)

*To all whom it may concern:*

Be it known that I, AUGUSTUS G. DEOBOLD, of Bloomington, in the county of McLean, and in the State of Illinois, have invented certain new and useful Improvements in Grain Scouring and Cleaning Machines; and I do hereby declare that the following is a full, clear, and exact description thereof, reference being had to the accompanying drawings, and to the letters of reference marked thereon, making a part of this specification.

My invention relates to a machine for scouring and cleaning wheat, grain, and like substances; and it consists, substantially, in the parts as constructed, and in the particular combinations thereof, to be hereinafter distinctly described, and pointed out in the claims.

The object of my invention is to furnish a machine for scouring and cleaning grain, that is comparatively inexpensive in the cost of manufacture, and one possessing great simplicity, ease of operation, and thorough effectiveness in the results to be accomplished.

Reference being had to the accompanying sheets of drawings, Figure 1 represents a sectional elevation, on line $y\ y$, Fig. 2, of a machine embodying my invention. Fig. 2 represents a front sectional elevation thereof on the line $x\ x$. Fig. 3 represents a perspective view of the revolving cylinder and its casing, both being partly broken away to more clearly indicate their construction. Fig. 4 is a sectional end view of the cylinder and its casing, being broken off at each end and showing the manner in which the same are constructed. Fig. 5 is a detail view showing the manner of constructing the casing and its inclosed cylinder.

Reference being had to the several parts by the letters marked thereon, A represents a structure comprising the machine proper, the same being of any suitable frame-work so united or put together as to form an upper chamber, $a$, in which is borne and revolves a fan, $b$, a suction spout or flue, $c$, communicating at its lower end with the external air, and the casing discharge spout, through which latter a current of air is caused to pass upward by the action of the fan, carrying therewith the chaff or beards from the grain, that is discharged from the cylinder-casing into said flue at the bottom; a discharge-hopper, $d$, located at the upper extremity of flue $c$ and communicating therewith; a valve, $e$, arranged intermediate of said hopper and suction-flue, for regulating the current of air passing through the latter, and an additional spout or flue, $f$, leading upward from an opening in one of the casing-heads, through which the dust or extremely-light particles are carried from between the cylinder and its casing during the scouring action to which the grain or other substance is subjected during its passage therethrough, said dust being carried off or discharged as indicated by the arrows.

Beneath the fan is located a stationary cylindrical casing, C, having an inlet spout or opening, $g$, through which the grain or other substance is fed. This casing is constructed of two heads, $c'\ c'$, in the center of one of which is an opening, $d'$, communicating with flue $f$, as shown. Said heads are formed with perforated radial lugs $e'$, and are provided at their edges with inner circumferential flanges or beading 1 2. Between the heads is held a cylindrical shell, the edges of which fit between the flanges 1 2, and whose inner surface is formed or provided with ribs or corrugations $i$, Fig. 4, extending from end to end thereof in an oblique direction and approximately forming a spiral around the shell in the direction of its length. The manner of securing the shell $h$ between the heads $c'\ c'$ is by rods $j$ fitting in the lugs $e'$ and tightened or secured in any suitable manner.

Within the shell a cylinder, D, revolves, the same being mounted or supported upon a shaft, $k$, extending between the sides of the machine in suitable bearings, as shown. This shell is constructed in like manner as its casing—i. e., of two heads, $l\ l$, formed with inner flanges, 3 4, the said heads securing between them a cylindric shell, $n$, to the outer surface of which is secured, by screws $o\ o$, a series of ribs, $p$, arranged in a similar direction to those on the inner surface of the casing. Motion is imparted to the apparatus by means of any suitable power connecting with the pulley $r$ on shaft $k$, from whence it is communicated by means of pulleys $s\ s'$ to the shaft $t$ by which the fan is revolved.

The nature of the general construction of my machine will be understood from the foregoing, and I will now proceed to describe the operation.

The grain, wheat, or other substance is fed between the revolving cylinder and its stationary casing through the opening $g$ in the latter. During the scouring and rubbing of the grain between the ribs on the opposite surfaces of the two, the fan causes a suction up through the flue $f$, and by which the dust or extremely-light particles are carried out. The substance is finally discharged through spout $u$ into the bottom of the flue $c$, and there it is met by the suction of air in said flue, the fine or extraneous particles being carried upward and discharged through hopper $d$, while the heavier are deposited in a heap to be gathered or collected. The valve $e$ can be operated to regulate the current of air in spout $c$, and at the bottom of the hopper is provided a flap-valve, M, which is for the purpose of preventing the passage of external air into the hopper, and which also is of sufficient flexibility to allow the chaff or screenings to fall through of their weight.

Having thus described my invention, I claim as new and desire to secure by Letters Patent—

1. A grain scouring and cleaning machine comprising the revolving cylinder and its casing, each being constructed of a cylindric shell whose contiguous surfaces are provided with series of oblique ribs secured by screws, and two heads having inner flanges or beads, the two air-flues, the revolving fan, the valve for regulating one of said flues, and a hopper into which the extraneous substances are received, the said hopper having at its lower end a flexible valve, all substantially as described.

2. In a grain scouring and cleaning machine, the combination of the revolving cylinder and its stationary casing, each being constructed of two heads having inner flanges or beads, and a cylindric shell held between such heads, having on their contiguous surfaces series of oblique ribs secured thereto by screws, substantially as described.

In testimony that I claim the foregoing I have hereunto set my hand, this 28th day of February, 1885.

AUGUSTUS G. DEOBOLD.

Witnesses:
THOS. SLADE,
R. J. CANNELL.